United States Patent
Patman Maguire

(10) Patent No.: US 9,229,926 B2
(45) Date of Patent: Jan. 5, 2016

(54) DETERMINING SIMILARITY OF UNFIELDED NAMES USING FEATURE ASSIGNMENTS

(71) Applicant: International Business Machines Corporation, Armonk, NY (US)

(72) Inventor: Frankie E. Patman Maguire, Washington D.C., WA (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 13/692,798

(22) Filed: Dec. 3, 2012

(65) Prior Publication Data

US 2014/0156261 A1    Jun. 5, 2014

(51) Int. Cl.
G06F 17/27    (2006.01)

(52) U.S. Cl.
CPC .......... *G06F 17/2785* (2013.01); *G06F 17/278* (2013.01)

(58) Field of Classification Search
CPC  G06F 17/2785; G06F 17/2735; G06F 17/278
USPC .................................................. 704/1, 8–10
See application file for complete search history.

(56) References Cited

U.S. PATENT DOCUMENTS

| | | | |
|---|---|---|---|
| 6,963,871 B1 | 11/2005 | Hermansen et al. | |
| 7,627,550 B1 | 12/2009 | Adams et al. | |
| 7,716,198 B2 | 5/2010 | Meyerzon et al. | |
| 7,805,430 B2* | 9/2010 | Reeb | 707/708 |
| 7,991,787 B2* | 8/2011 | Klein | 707/780 |
| 2008/0114583 A1* | 5/2008 | Al-Onaizan et al. | 704/2 |
| 2008/0312909 A1* | 12/2008 | Hermansen et al. | 704/9 |
| 2009/0248414 A1 | 10/2009 | Shimomori et al. | |
| 2009/0319521 A1* | 12/2009 | Groeneveld et al. | 707/6 |
| 2011/0161144 A1* | 6/2011 | Mizuguchi et al. | 705/14.4 |
| 2012/0016660 A1 | 1/2012 | Gillam et al. | |
| 2013/0138427 A1* | 5/2013 | de Zeeuw et al. | 704/9 |
| 2013/0282361 A1* | 10/2013 | Hartl et al. | 704/9 |

OTHER PUBLICATIONS

Anonymous, "Searching Name Lists Using Unique Name Elements", Retrieved from the Internet at <URL: http://priorartdatabase.com/IPCOM/000203578, Jan. 28, 2011, Total 3 pp.

Cheriton, D.R. and T.P. Mann, "A Decentralized Naming Facility", Retrieved from the Internet at <URL: http://www.ip.com/pubview/IPCOM000128292D, Dec. 31, 1985/Sep. 15, 2005, Total 29 pp.

Mell, P. and T. Grance, "Effectively and Securely Using the Cloud Computing Paradigm", NIST, Information Technology Laboratory, Oct. 7, 2009, Total 80 pp.

(Continued)

*Primary Examiner* — Douglas Godbold
(74) *Attorney, Agent, or Firm* — Janaki K. Davda; Konrad, Raynes, Davda & Victor LLP

(57) ABSTRACT

Provided are techniques for comparing names. A first phrase score is obtained by comparing a name phrase in a first name to a name phrase in a second name. A second phrase score is obtained by comparing another name phrase in the first name to another name phrase in the second name. An overall score is generated based on the obtained first phrase score and the obtained second phrase score. The overall score is updated based on comparing features of the first name with features of the second name.

10 Claims, 7 Drawing Sheets

(56) References Cited

OTHER PUBLICATIONS

Mell, P. and T. Grance, "The NIST Definition of Cloud Computing (Draft)", National Institute of Standards and Technology, Jan. 2011, Total 7 pp.
Preliminary Remarks, Jul. 11, 2013, for U.S. Appl. No. 13/939,718, filed Jul. 11, 2013 by F.E. Patman Maguire, Total 2 pp.
U.S. Patent Application with U.S. Appl. No. 13/939,718, filed Jul. 11, 2013, entitled, "Determining Similarity of Unfielded Names Using Feature Assignments", invented by Patman Maguire, F.E., Total 38 pp.
Office Action 1, Oct. 9, 2014, for U.S. Appl. No. 13/939,718, filed Jul. 11, 2013 by F.E. Patman Maguire, Total 14 pp.
Response to Office Action 1, Jan. 9, 2015, for U.S. Appl. No. 13/939,718, filed Jul. 11, 2013 by F.E. Patman Maguire, Total 7 pp.
Final Office Action, Feb. 3, 2015, for U.S. Appl. No. 13/939,718, filed Jul. 11, 2013 by F.E. Patman Maguire, Total 11 pp.
Response to Final Office Action, May 1, 2015, for U.S. Appl. No. 13/939,718, filed Jul. 11, 2013 by F.E. Patman Maguire, Total 7 pp.
Office Action 3, May 26, 2015, for U.S. Appl. No. 13/939,718, filed Jul. 11, 2013 by F.E. Patman Maguire, Total 17 pp.
Response to Office Action 3, Aug. 18, 2015, for U.S. Appl. No. 13/939,718, filed Jul. 11, 2013 by F.E. Patman Maguire, Total 9 pp.
Notice of Allowance, Sep. 8, 2015, for U.S. Appl. No. 13/939,718, filed on Jul. 11, 2013 by F.E. Patman Maguire, Total 9 pp.

* cited by examiner

DETERMINING SIMILARITY OF UNFIELDED NAMES USING FEATURE ASSIGNMENTS

FIELD

Embodiments of the invention relate to determining the similarity of unfielded names using feature assignments.

BACKGROUND

Data storage systems typically break personal names into multiple parts (i.e., parse the personal names) and store these parts in different fields, which may be labeled with terms such as "given name," "middle name," "surname," etc. Such a parsed name may be referred to as a fielded name, and parts of the name may be referred to as terms. Record retrieval systems then compare members of the same field to each other to determine which names are a match for a query. For example, a search for a database record with the name-related fields "GivenName=Mary", "Surname=Smith" would compare "Mary" to terms stored in the field named "GivenName" and "Smith" to terms stored in the field named "Surname."

Fielded names contribute to match failures in searches based on name because there is not always a strict correspondence between the terms used in a name and the fields into which the terms are parsed. This is especially true when names from various linguistic and cultural origins are stored in a system designed around one name model. For example, a typical male name in Saudi Arabia is made up of a person's given name, his father's name, his grandfather's name, and a family or tribal name. Western data storage systems may store names in the following fields: "given name," "middle name," and "surname". In such systems, the given name portion of the Saudi Arabian name corresponds to the given name field found in the Western data storage systems. Other parts of the Saudi Arabian name may be distributed across the available fields in various ways in different data storage systems. When a name search is done, the inconsistent fielding may lead to there being no corresponding name parts within the same fields as those of the query.

Some search systems allow multiple parses of the names to be compared, and then searching on each of the possible parses. For example, "Islam Azam Muhammed Metwali" might be variously represented as "Metwali, Islam Azam Muhammed," "Muhammed Metwali, Islam Azam," and "Azam Muhammed Metwali, Islam." While this strategy may reduce the chance that relevant names will be missed altogether, it also tends to increase the number of false positives returned by a search. For example, "Mohammedi, Islam Baahi" would be allowed by the third parse, even though it is not a variant form of "Islam Azam Muhammed Metwali." This approach also requires multiple comparisons, which increases search times.

Other systems match on tokens rather than names, then return the full names containing the matching tokens. A token may be described as a space-delimited sequence of characters representing a word in a name. In these other systems, returned names may be sorted for presentation based on various filtering or relevance criteria. The sorting criteria may be based on factors other than token similarity. For example, in one system, a search on "Fernando Gomes" with no further qualifying information returns "Fernando Jose Ferreira Gomes" and "Fernando Gomes da Gama," as the top two out of twenty matching names, ahead of the exact match "Fernando Gomes," and then also returns "Paulo Francisco Gomes Fernandez" ahead of "Fernando Luciano Gomes de Mendezes," even though the latter name is more similar to the query.

SUMMARY

Provided are a method, computer program product, and system for comparing names. A first phrase score is obtained by comparing a name phrase in a first name to a name phrase in a second name. A second phrase score is obtained by comparing another name phrase in the first name to another name phrase in the second name. An overall score is generated based on the obtained first phrase score and the obtained second phrase score. The overall score is updated based on comparing features of the first name with features of the second name.

BRIEF DESCRIPTION OF THE SEVERAL VIEWS OF THE DRAWINGS

Referring now to the drawings in which like reference numbers represent corresponding parts throughout:

FIG. 2 is formed by FIG. 2A, FIG. 2B, and FIG. 2C.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
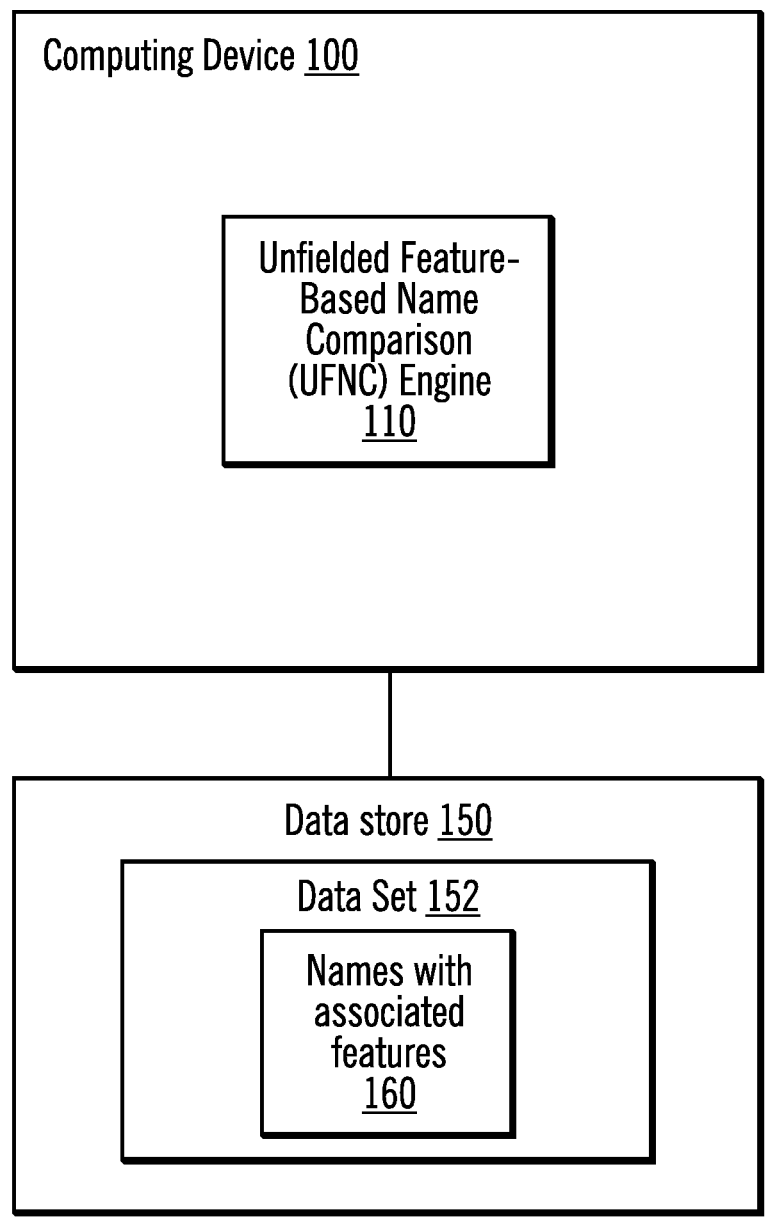
FIG. 1 illustrates a computing environment in accordance with certain embodiments.

FIG. 1 illustrates a computing environment in accordance with certain embodiments. A computing device 100 includes an Unfielded Feature-Based Name Comparison (UFNC) engine 110. The computing device 100 is coupled to a data store 150. The data store 150 stores one or more data sets (e.g., data set 152), and each data set stores names (e.g., personal names) with associated features (i.e., characteristics). For example, dataset 152 stores names with associated features 160. In certain alternative embodiments, the features may be stored separately from the names and linked to the names. In certain embodiments, a data set may store names, and the features may be generated at a later time. The features include sequential, hierarchical, and semantic features. The features capture fielding, ordering, and other information that is used when comparing names. For example, the features may capture position, gender, field association, number of name phrases, number of tokens, etc.

The UFNC engine 110 compares a received name (e.g., a name received in a query) to a comparand name (i.e., a name 160 stored in the data store 150 to which the received name is compared). The received name may be referred to as a first name, and the comparand name may be referred to as a second name.

The UFNC engine 110 treats a name as a set of sequentially, hierarchically, and semantically related strings in which the relationships between the members of the set of strings making up the full name are encoded as features associated with those strings. Each member string may be described as a name phrase, and a name phrase may be described as one or more name stems or roots along with any associated dependent elements, such as affixes. The UFNC engine 110 compares each member of the set of strings of a received name to each member of the set of comparand strings of a comparand name. The UFNC engine 110 considers the features assigned to each member during the comparison. Incompatible or different features may cause an adjustment of the initial score, with the degree and type of adjustment depending on the identity and nature of the particular feature, to generate an updated score. The score may be described as a string comparison score or a similarity score.

The UFNC engine 110 avoids the partitioning of names into different fields for name comparison, so that such partitioning does not prevent the return of relevant matching names. Concurrently, the UFNC engine 110 allows recognized relationships between parts of a name to be considered as part of the calculation of similarity between two names. The distinction between names such as "James Robert" and "Robert James" may be maintained, without absolutely preventing a match in the case that one of these names represents a parsing error or discrepancy. Further, information such as the relative ordering of the parts of the name across the entire name may be maintained and used in the determination of the score for the comparison.

Names have syntactic structure, like other parts of language. For example, a name may be formed by some combination of syntactic structural elements such as: a determiner, a preposition, a stem, a noun phrase, etc., such as illustrated in the following examples:

la+Cruz
determiner+stem=noun phrase
de+la Cruz
preposition+noun phrase=prepositional phrase=name phrase
Juan+de la Cruz
name phrase+name phrase
given name+surname=full name
Juan+de la Cruz+Gomez
given name+surname+matronymic=full name In addition, name permutations are governed by linguistic and cultural rules, which is illustrated in the following examples of names in Set A and Set B:

Set A.a Juan de la Cruz Gomez=Juan de la Cruz
Set A.b Juan de la Cruz Gomez≠Juan Gomez
Set A.c Juan de la Cruz≠Juan Cruz
Set A.d Juan de la Cruz Gomez≠Juan Gomez de la Cruz
Set A.e Juan de la Cruz Gomez=Juan Carlos de la Cruz
Set B.a Robert Allen Farnsworth=Robert Farnsworth
Set B.b Robert Allen Farnsworth≠Robert Allen As an example, in Spanish names (see the Set A of names above), a person typically has two given names, a surname, and a matronymic (mother's surname). The name may appear with one or both given names, the surname, and, optionally, with the matronymic. The name does not appear with just the given names and the matronymic. Also, the order of the surname and the matronymic indicates which name is which—surname is on the left, and matronymic is to the right of the surname.

With reference to the pair of names in Set A.e, the name on the left of the equal sign consists of GIVEN NAME+SURNAME+MATRONYMIC. The name on the right of the equal sign consists of GIVEN NAME+GIVEN NAME+SURNAME. While the leftmost element in each is the given name, the second element in one is a surname and in the other is a given name, and the third element in one is a matronymic and in the other a surname. UFNC engine 110 compares element two in one name to element three in the other name (i.e., compares the surname in the name on the left to the surname in the name on the right. The UFNC engine 110 makes the determination to compare element two in one name to element three in the other name based on the features that each of the elements has.

With the UFNC engine 110, names are no longer treated as fielded data, while syntactic information is retained. Thus, names may be said to be unfielded. The following provides examples of syntactic information:

| Given Name Field | [ Juan Carlos ] | Surname Field | [ de la Cruz Gomez ] |
|---|---|---|---|
| | [ Juan ] | | [ de la Cruz ] |
| | [ Juan Carlos ] | | [ de la Cruz ] |
| | [ Juan ] | | [ Gomez ] |
| | [ Juan Carlos ] | | [ Gomez ] |

The following provides examples of full names:

| Name | [ Juan Carlos de la Cruz Gomez ] |
|---|---|
| | [ Juan de la Cruz ] |
| | [ Juan Carlos Gomez ] |
| | [ Juan Carlos de la Cruz ] |
| | [ Juan de la Cruz Gomez ] |
| | [ Juan Gomez ] |

The following examples of Set C provide sample positions in a name:

First position Middle position Middle position Last position

| | First | Middle | Middle | Last |
|---|---|---|---|---|
| Set C.1 | Juan | | | de la Cruz |
| Set C.2 | Juan | | Gomez | de la Cruz |
| Set C.3 | Juan | | Carlos | de la Cruz |

In the above names, the name Set C.1 is equivalent to the name Set C.3, but name Set C.1 is not equivalent to name Set C.2 (i.e., name 1=name 3, but name 1≠name 2). In particular, in Set C1, the person's given name is 'Juan' and his family name is 'de la Cruz'. In Set C2, the person's given name is 'Juan' and his family name is 'Gomez'; the 'de la Cruz' in C2 is Juan's mother's family name. Note that in Spanish names, there are generally two surnames in a name: the leftmost of those two surnames is the individual's own family name, and the rightmost surname is his or her mother's family name. In other words, Spanish names use both the family name they inherit from their father, and the surname their mother uses. However, if the individual is going to write down just his own surname, he uses his father's family name, not his mother's family name. In Set C3, the person's full given name is 'Juan Carlos' and his family name is 'de la Cruz'. Since Set C1 and Set C3 share the same family name, and both of these names also have the same first name 'Juan,' these two names may be determined to be interchangeable. However, Set C2 has a different family name ('Gomez') and is therefore a different name.

The following examples provide sample elements of a name, including given name, surname, and matronymic:

| Given name | Given name | Surname | Matronymic |
|---|---|---|---|
| Juan | | de la Cruz | |
| Juan | | Gomez | de la Cruz |
| Juan | Carlos | de la Cruz | |

The UFNC engine 110 retains such information for accurate matching, despite the loss of the physical structures that had been created by fields. Assigning features allows both the flexibility of unfielded matching and the accuracy of fielded matching.

Figure 2A:
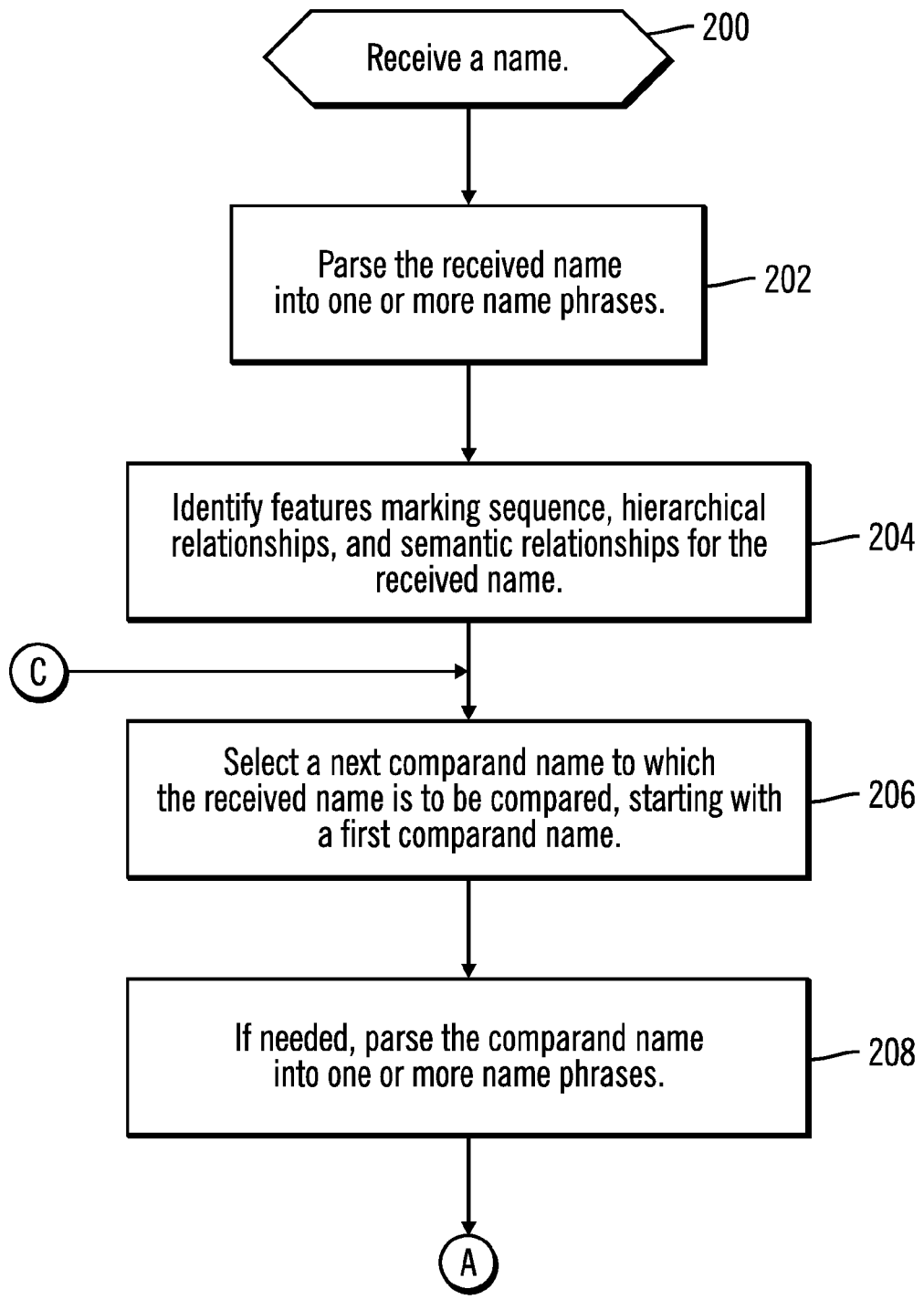
FIG. 2 illustrates, in a flow diagram, operations for comparing two names using features in accordance with certain embodiments.
Figure 2B:
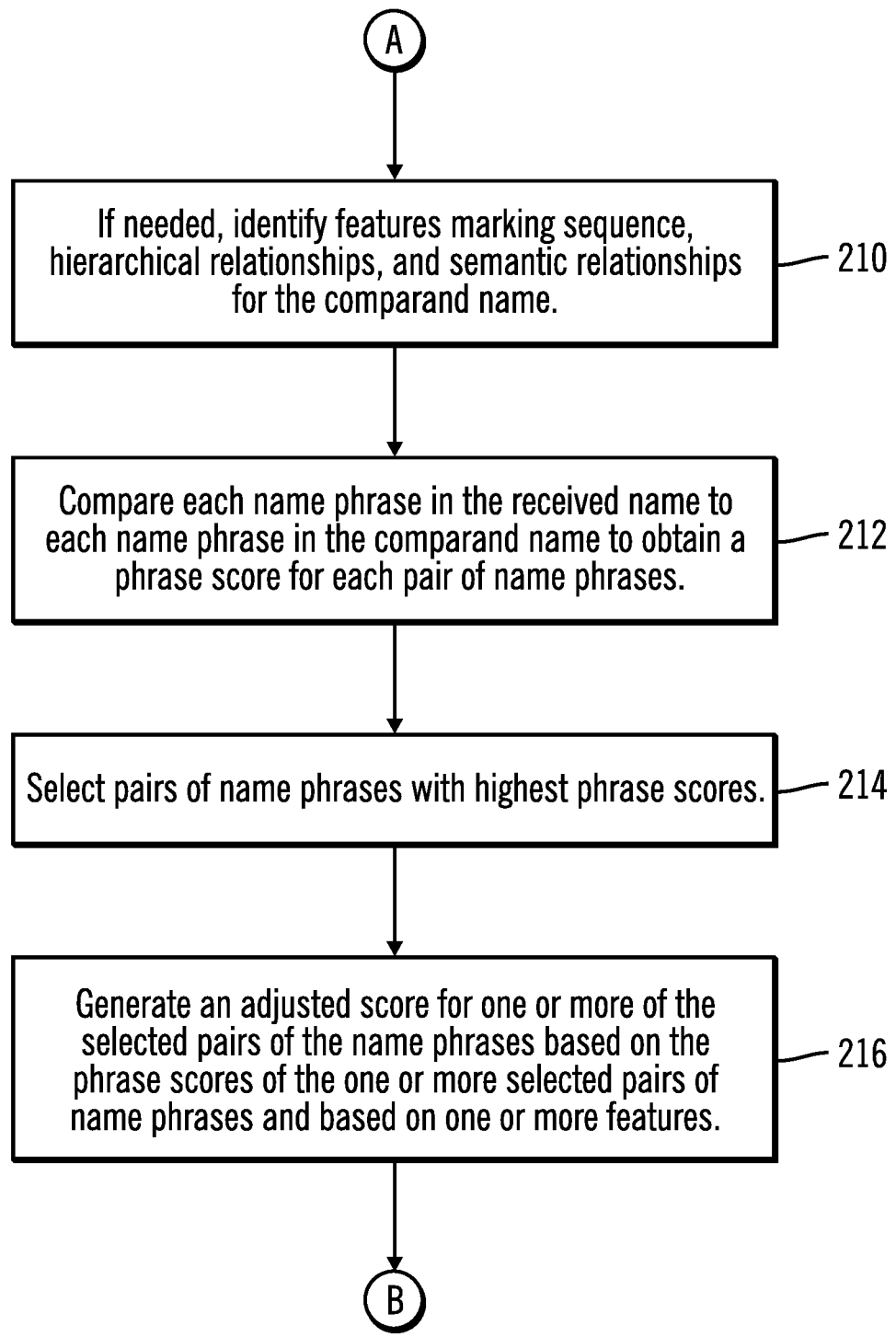
Figure 2C:
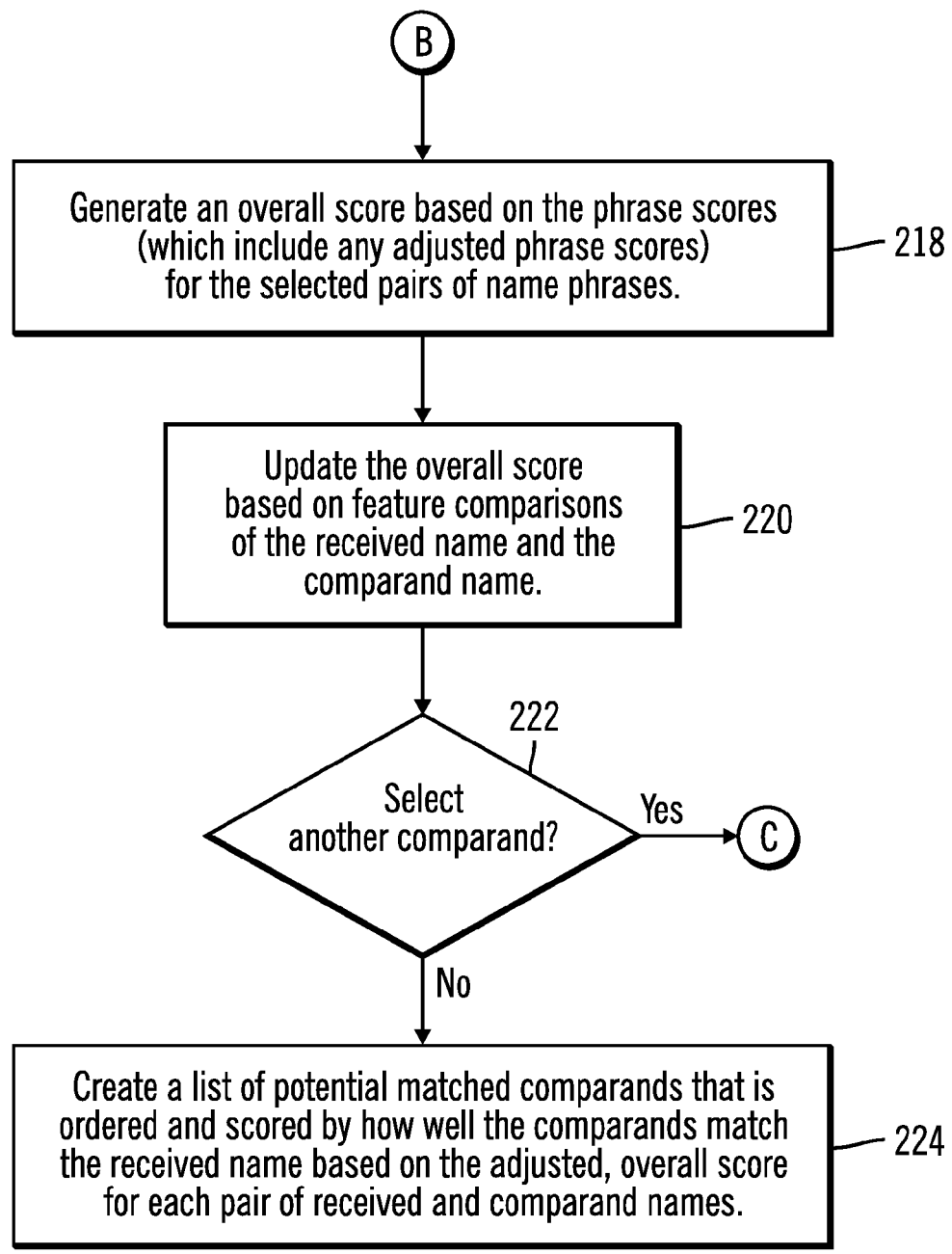

FIG. 2 illustrates, in a flow diagram, operations for comparing two names using features in accordance with certain embodiments. FIG. 2 is formed by FIG. 2A, FIG. 2B, and FIG. 2C. Control begins at block 200 with the UFNC engine 110 receiving a name to be compared to the stored names 160.

In block 202, the UFNC engine 110 parses the received name into one or more name phrases making up the name. A name phrase may be described as a set of one or more tokens, related by dependencies, and that can function as an independent unit. A name phrase may consist of a single independent name stem (e.g., Smith), a name stem, and any tokens with which the name phrase has dependency relationships, such as prefixes or suffixes (e.g., van der Meer), or the name phrase may consist of a set of independent name stems that together from a compound stem (e.g. Jose-Maria; Varga y Diaz).

In block 204, the UFNC engine 110 identifies features marking sequence, hierarchical relationships, and semantic relationships for the received name. With embodiments, features marking sequence, hierarchical relationships, and semantic relationships are identified (e.g., determined and stored) for a received name and a comparand name before the UFNC engine 110 performs comparisons of the received name and the comparand name.

A sequential feature indicates the order in which each word or name phrase in the name appears relative to the other words and name phrases in the name. A hierarchical feature recognizes dependency relationships between multiple words that form a single name phrase or between groups of name phrases that form a higher-level structure (such as a given name or a full name). A semantic feature indicates the function the word or name phrase performs within the context of the full name. Semantic features may include information about cultural or linguistic derivation or association. Semantic features may also be assigned at the level of higher structures, such as full name. Features may be assigned manually (e.g., by a user or system administrator) or by an automated technique.

In certain embodiments, sequential features may be expressed as ordinals, numbers, directional words (e.g., left, leftmost, etc.), or with any other terminology or symbols or data structures to express sequential relationships. In certain embodiments, hierarchical features may use syntactic terminology, numbers, or any other words or symbols or data structures to express dependency relationships. In certain embodiments, semantic features may be expressed as labels for fields, as culture-specific labels for the functional parts of a name (e.g. nasab, matronymic), or with any terminology or symbols or data structures to express functional relationships between the words and name phrases in a name. In certain embodiments, higher-level semantic features may be assigned to part or all of the name to account for considerations, such as gender.

In block 206, the UFNC engine 110 selects a next comparand name to which the received name is to be compared, starting with a first comparand name. In block 208, the UFNC engine 110, if needed, parses the comparand name into one or more name phrases making up the name. In certain embodiments, the parsing of the comparand name is performed before the processing of FIG. 2 occurs (e.g., when the comparand name is stored in data store 150), and the name phrases are stored and associated with the name in the data store 150. In certain alternative embodiments, the parsing of the comparand name occurs in real-time in block 208. From block 208 (FIG. 2A), processing continues to block 210 (FIG. 2B).

In block 210, the UFNC engine 110, if needed, identifies features marking sequence, hierarchical relationships, and semantic relationships for the comparand name.

In block 212, the UFNC engine 110 compares each name phrase in the received name to each name phrase in the comparand name to obtain a phrase score for each pair of name phrases. In various embodiments, the comparison may be done by one or more string comparison techniques and may use dependency features within the name phrases to distinguish which tokens in one name phrase are compared to which tokens in the other name phrase and what adjustments may be applied for incompatible or missing dependency features. For example, take the name "Maria del Carmen." This is a compound name made up of two name phrases. The name phrase "del Carmen" consists of a stem and a prefix. The name is a female name. A particular instantiation might assign sequential, hierarchical [i.e., "del" is a dependency of "Carmen"], and semantic (e.g., assigning gender to this part of the name) features. As another example, a different instantiation might assign gender at the level of the full name, rather than the name phrase, so that gender wouldn't be one of the features to be compared during the initial name phrase-level comparisons.

With reference to incompatible or missing dependency features, take a comparison between "Carmen Maria" and "Maria del Carmen." The absence of the prefix "del" in the first name is a significant differentiation. Some adjustment to the phrase score may be applied for this lack of feature correspondence between "Carmen" and "del Carmen," even though both the name phrases share the same stem "Carmen."

In block 214, the UFNC engine 110 selects name phrases with the highest phrase scores. In block 216, the UFNC engine 110 generates an adjusted score for one or more of the selected pairs of the name phrases based on the phrase scores of the one or more selected pairs of name phrases and based on one or more features. From block 216 (FIG. 2B), processing continues to block 218 (FIG. 2C).

In particular, the UFNC engine 110 may adjust a phrase score based on comparing features of the received name with features of the comparand name. For example, some phrase scores may be adjusted at the level of the name phrase comparisons. For example, the UFNC engine 110 may adjust the phase score (i.e., a name phrase-level score) for a comparison between "Carmen" and "del Carmen," reducing the score for the lack of a corresponding prefix feature. On the other hand, an adjustment for the ordering difference in "Carmen Maria" and "Maria del Carmen" may be made as an adjustment to summed phrase scores. The goal here is to first determine which name phrases from Name-1 correspond in terms of string similarity to name phrases from Name-2 (i.e. "Maria-1" and "Maria-2" are most similar, and "Carmen-1" and "del Carmen-2" are most similar). Then, the UFNC engine 110 considers any other features of the two names being compared and further adjusts the phrase score as needed. Some feature considerations may take place even at the level of name phrase comparison, such as for "Carmen" versus "del Carmen".

In block 218, the UFNC engine 110 generates an overall score based on the phrase scores (which include any adjusted phrase scores) for the selected pairs of name phrases. The overall score is associated with the received name and the selected comparand name (selected in block 206).

In block 220, the UFNC engine 110 updates the overall score based on feature comparisons of the received name and the comparand name. The UFNC engine 110 makes adjustments to initial scores (i.e., the string comparison scores) first to name phrases, based on feature comparisons, and then to higher-level structures, including those assigned to the full name to obtain updated scores. That is, features may pertain not just to name phrases, but to larger name structures as well. For example, a gender feature may be assigned at the level of the name phrase, at the full set of name phrases that make up the given name, or at the full name. In particular, in "Anna Maria Smith", the features may be applied as: (1) [anna]female [maria]female [smith], (2) [[anna] [maria]]female [smith] or (3) [[[anna] [maria]] [[smith]]]female.

In block 222, the UFNC engine 110 determines whether another comparand is to be selected. If so, processing continues to block 206 (FIG. 2A), otherwise, processing continues to block 224. In certain embodiments, all names in the data store are selected as comparands. In certain alternative embodiments, a user (e.g., a system administrator) may select a subset of names to be selected as comparands (e.g., based on culture, language, profession, etc.). In block 224, the UFNC engine 110 creates a list of potential matched comparands (e.g., names from the stored names 160) that is ordered and scored by how well the comparands match the received name (i.e., ordered by the updated, overall scores) based on the updated, overall score for each pair of received and comparand names.

In the following illustrative examples, names are assigned features for field (given name (GN) or surname (SN)), cultural association (represented in these examples as a digit, as in 1=English, 2=Arabic, etc.), position within the sequence of name phrases assigned the feature GN or the feature SN (e.g., first GN, second GN, represented here as a digit 1, 2, etc.), position within the overall sequence of name phrases (e.g., first, second; represented here as a digit 1, 2, 3, etc.), whether the GN and SN field feature assignments made as a result of a parse are the only field assignments allowed by the parse (feature indicated by O) or whether they are secondary assignments (indicated by A) because of other allowable parses, and gender (indicated by F, M, or FM). This particular representation of features is for illustrative purposes only and is not intended to define what features may be assigned or the mechanism by which such features may be associated with a name or parts of a name.

(PHRASE[Field (GN or SN),Culture(1=English 2=Arabic),Position in field,Position in name])[Parse(O or A),Gender(M or F)]
    Set D.1    (ANN[GN,1,1,1] MARIE[GN,1,2,2] JONES[SN,1,1,3]
SMITH[SN,1,2,4])[O,F]
    Set D.2    (((ANNA[GN,1,1,1] LEE[GN,1,2,2] SMITH[SN,1,1,3)
[A])((ANNA[GN1,1,1] LEE[SN,1,1,2] SMITH[SN,1,2,3]) [O]) F)
    Set D.3    ((((SHELBY[GN,1,1,1] LYNN[SN,1,1,2])
[O])((SHELBY[SN,1,1,2] LYNN[GN,1,1,1])[A])),[FM])
    Set D.4    ((JAFAR[GN,2,1,1] TARIQ[GN,2,2,2] MUHAMMADI[SN,2,1,3])[O,M])
    Set D.5    ((TARIQ[GN,2,1,1] JAFAR[GN,2,2,2] MUHAMMADI[SN,2,1,3])[O,M])

The names in Set D.4 and Set D.5 might compare as follows:
JAFAR↔ TARIQ=very low string score
JAFAR↔ MUHAMMADI=no string similarity
TARIQ↔ MUHAMMADI=no string similarity
JAFAR↔ JAFAR=strings are identical so assign highest score, position in field feature is different [1↔ 2] so adjust score
TARIQ↔ TARIQ=strings are identical so assign highest score, position in field feature is different [1↔ 2] so adjust score
MUHAMMADI↔ MUHAMMADI=strings are identical so assign highest score, all features the same, so no score adjustment
JAFAR TARIQ MUHAMMADI↔ TARIQ JAFAR MUHAMMADI=name-level features the same, so no further feature-based score adjustment Although each name phrase in Set D.4 is paired with an identical name phrase in Set D.5 and, thus, would have a perfect string match score, the features associated with two of the pairs are different. The scores for these name phrases are, therefore, adjusted to reflect the dissimilarities in the features and, thus, the dissimilarities in the names. Hence, if a query were JAFAR TARIQ MOHAMED, the string JAFAR TARIQ MUHAMMADI would be scored as a better match than would TARIQ JAFAR MUHAMMADI, since the positional feature mismatch penalties in the latter case would lower the comparison score.

The following is an example list of name formats found in modern data collections.
    GARCIA RUIZ JOSE LUIS
    JOSE LUIS GARCIA RUIZ
    GARCIA NUNEZ JOSE
    JOSE GARCIA NUNEZ
    DIAZ JOSE MANUEL GARCIA BELTRAN Y
    JOSE MANUEL GARCIA BELTRAN Y DIAZ
    GARCIA JOSE MANUEL BELTRAN The following is an example of the above names being encoded with features:

Set E.a JOSE GARCIA
JOSE features{ givenName, gnAnchor, namePosition1 }
GARCIA features{ surname, snAnchor, namePosition2 }
Set E.b GARCIA JOSE MANUEL BELTRAN
GARCIA features{ surname, snNonAnchor, namePosition1 }
JOSE features{ givenName, gnAnchor, namePosition2 }
MANUEL features{ givenName, gnNonAnchor, namePosition3 }
BELTRAN features{ surname, snAnchor, namePosition4 }
Set E.c GARCIA NUNEZ JOSE
GARCIA features{ surname, snAnchor, namePosition1 }
NUNEZ features{ surname, snNonAnchor, namePosition2 }
JOSE features{ givenName, gnAnchor, namePosition3 }

Each of the encoded names has been broken into name phrases, and each name phrase has been marked with a set of features that express information about the role of that name phrase within the full name. Notice that in names in Set E.a and Set E.c, both instances of the name phrase JOSE share two out of three of the assigned features, and both instances of GARCIA likewise share two out of three features. Notice as well that in name Set E.b, the name phrase GARCIA differs from the corresponding name phrases in Set E.a and Set E.c in that it is marked as snNonAnchor, while Set E.a and Set E.c are both marked as snAnchor. This feature mismatch represents a strong difference between name Set E.a and name Set E.b, specifically that GARCIA is the family name of the person referred to by name Set E.a, while it is not the family name of the person referred to in name Set E.b. In other words, these two names are not likely to refer to the same person. The value of this feature mismatch is factored into the overall score for the comparison between Set E.a and Set E.b and is used to prevent or deprecate a match between these two names. Thus, names Set E.a and Set E.c will receive high similarity scores, despite the difference in the order of the name phrases, while Set E.b will be disallowed as a match for Set E.a.

The following are example names in Set F:

```
Set F.a JO ALEXANDER
    JO features{ surname, snAnchor, namePosition1 } features{
    givenName,
gnAnchor, namePosition1 }
    ALEXANDER features{ givenName, gnAnchor, namePosition2 }
    features{
surname, snAnchor, namePosition2 }
Set F.b JOSEPHINE ALEXANDER
    JOSEPHINE features{ givenName, gnAnchor, namePosition1 }
    ALEXANDER features{ surname, snAnchor, namePosition2 }
```

With reference to the Set F names, two comparisons of name phrases take place, since JO<-->JOSEPHINE and ALEXANDER<-->ALEXANDER, each meet match conditions and trigger an exit from the process of string comparison. The double headed arrow ("<-->") indicates that two name phrases pair up with each other. As another example, if the input orders were ALEXANDER JO and JOSEPHINE ALEXANDER, the maximum number of comparisons would be three. That is, JO<-->JOSEPHINE and ALEXANDER<-->ALEXANDER each share a matching feature set, so these names may be considered to match. A score adjustment may optionally be made in consideration of there being two different feature sets associated with the name phrases in name Set F.a; that is, the existence of a second and different feature set may be read as introducing uncertainty about the correct interpretation of the name, this uncertainty being captured in a reduced score for the comparison.

Thus, the UFNC engine 110 (1) reduces false negatives in search results by eliminating name fields as barriers to comparison; (2) reduces false positives by requiring comparison of all name phrases in the full query name to all name phrases in the full comparand; (3) increases ease in identifying the most relevant comparands by allowing for scores that take into account differentiating features based on the full names being compared, which can then be used for ranking search returns; (4) increases performance times by eliminating unnecessary additional searches on alternate parsed forms of the names being compared.

The UFNC engine 110 uses the semantic and hierarchical structure defined by the parse language, and then uses that structure to weight parse term similarities to give better match scores.

The UFNC engine 110 determines similarity between unparsed names. Each of the names has a set of sequentially, hierarchically, and semantically related strings, termed name phrases. The relationships between the members of the set of strings making up the full name within the language are defined as features associated with those strings. Two names are compared by: comparing each name phrase in the received name to each name phrase in the comparand; using string comparison techniques to score the similarity of each name phrase; creating pairs of strings that have the highest comparison scores; creating an overall score based on a summation of the pair comparison scores; updating the overall score using the feature information on name phrases, to give higher scores when the features match. In particular, the overall score is increased when sequential, hierarchical, and/or semantic features match. The UFNC engine 110 also creates a list of potential matches from a set of known names that is ordered and scored by how well they match the received name.

The UFNC engine 110 differentiates degrees of similarity in names that are compared without being parsed into separate fields.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 3:
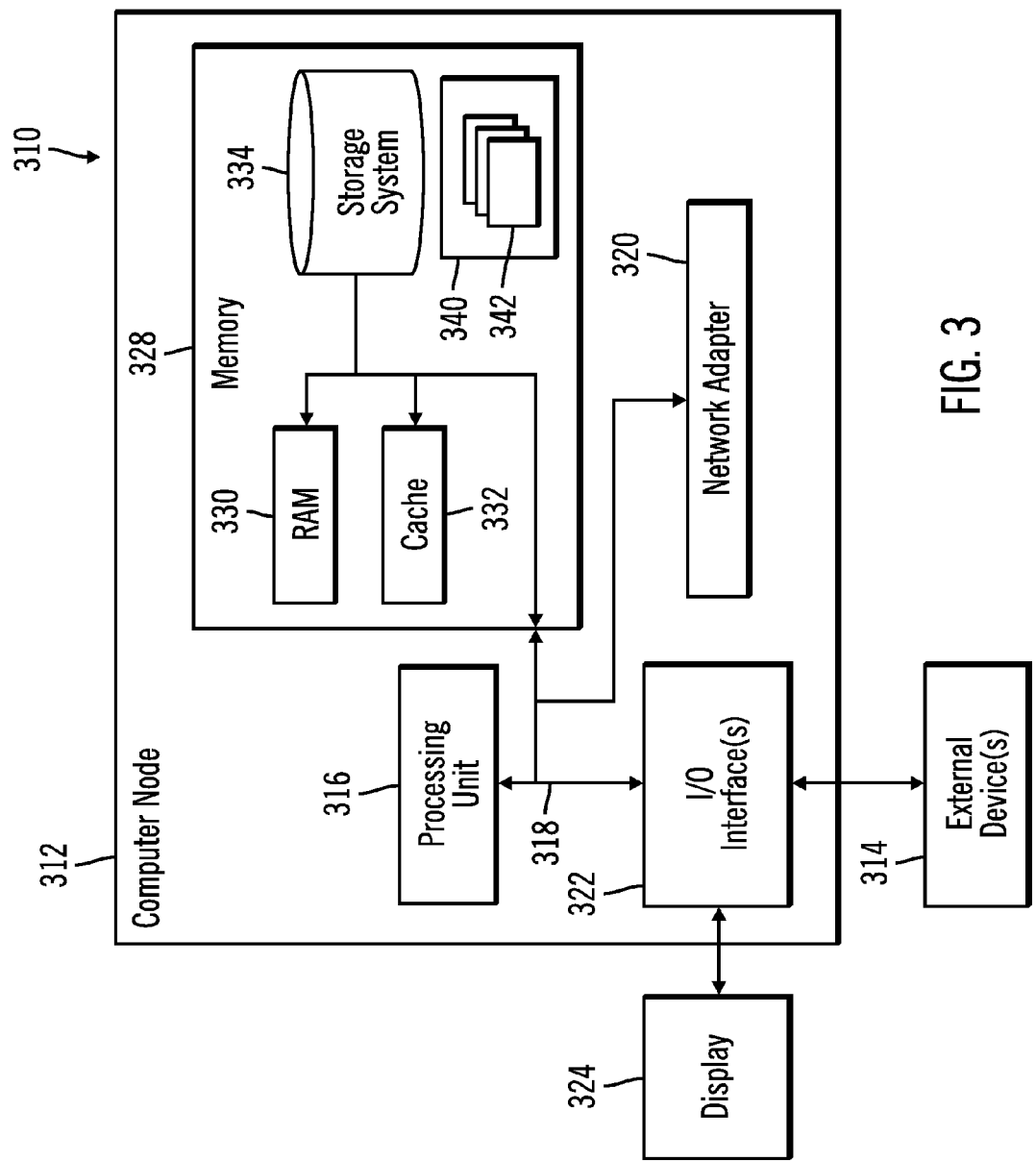
FIG. 3 depicts a cloud computing node in accordance with certain embodiments.

Referring now to FIG. 3, a schematic of an example of a cloud computing node is shown. Cloud computing node 310 is only one example of a suitable cloud computing node and is not intended to suggest any limitation as to the scope of use or functionality of embodiments of the invention described herein. Regardless, cloud computing node 310 is capable of being implemented and/or performing any of the functionality set forth hereinabove.

In cloud computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312;

and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Figure 4:
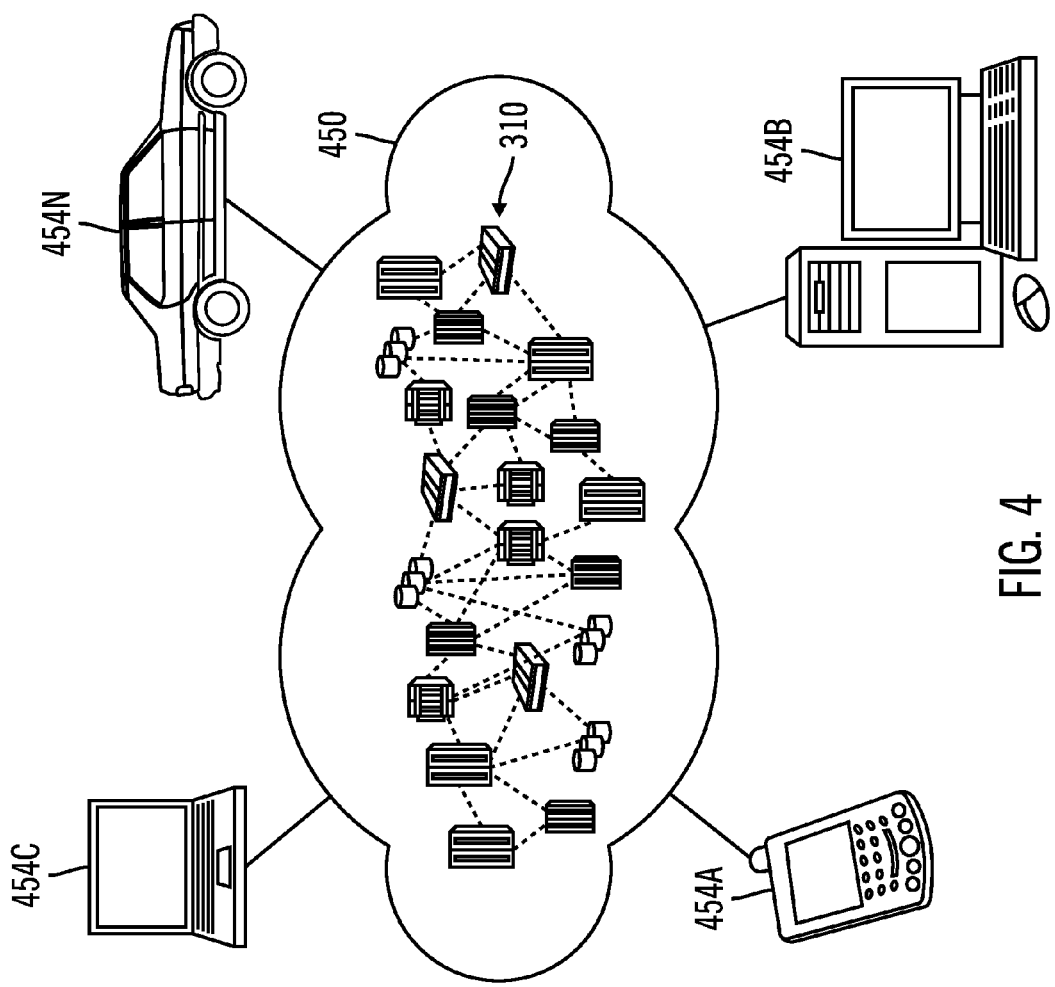
FIG. 4 depicts a cloud computing environment in accordance with certain embodiments.

Referring now to FIG. 4, illustrative cloud computing environment 450 is depicted. As shown, cloud computing environment 450 comprises one or more cloud computing nodes 310 with which local computing devices used by cloud consumers, such as, for example, personal digital assistant (PDA) or cellular telephone 454A, desktop computer 454B, laptop computer 454C, and/or automobile computer system 454N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 310 and cloud computing environment 450 can communicate with any type of computerized device over any type of network and/or network addressable connection (e.g., using a web browser).

Figure 5:
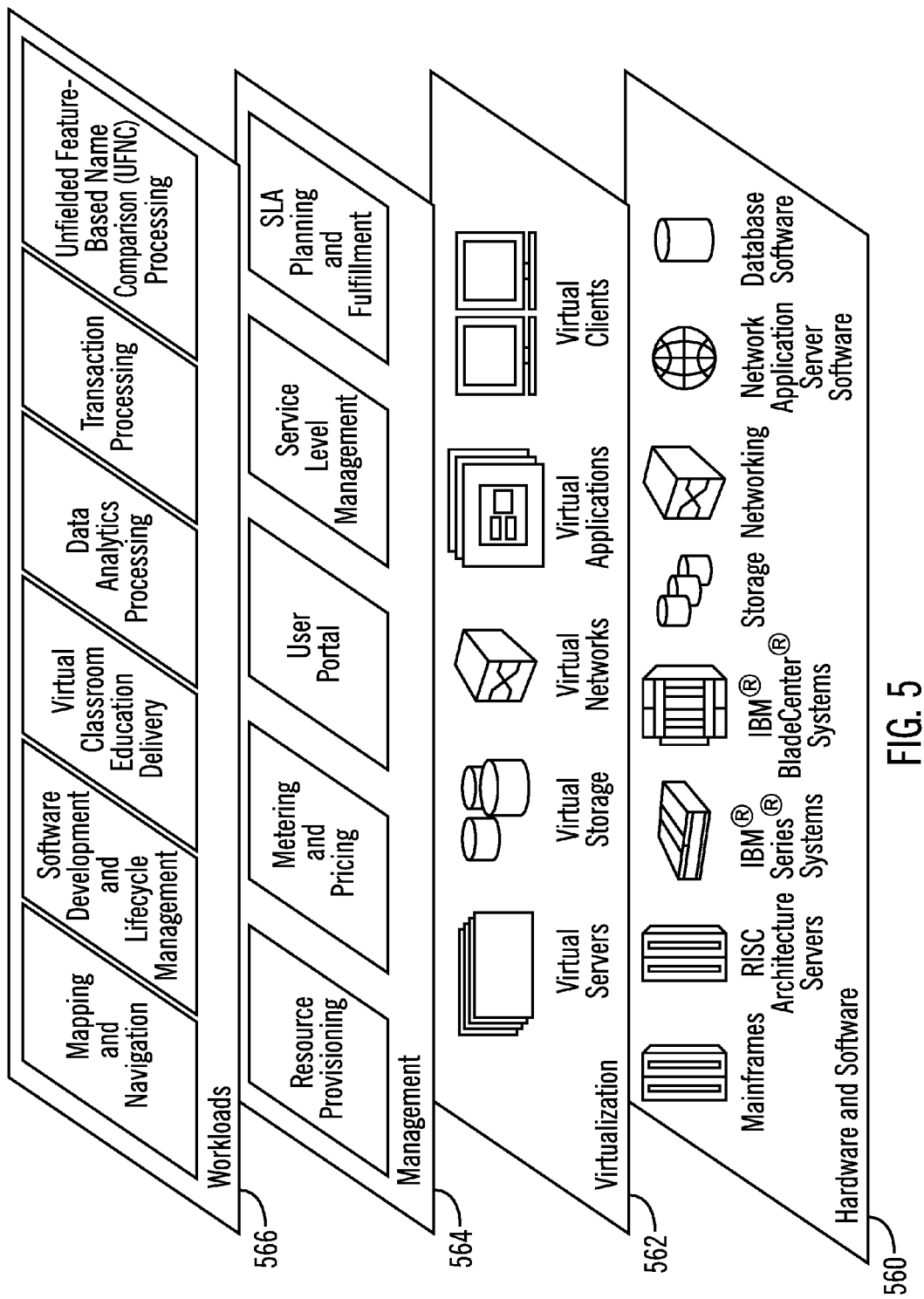
FIG. 5 depicts abstraction model layers in accordance with certain embodiments.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 562 provides an abstraction layer from which the following examples of virtual entities may be provided: virtual servers; virtual storage; virtual networks, including virtual private networks; virtual applications and operating systems; and virtual clients.

In one example, management layer 564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and UFNC processing.

Thus, in certain embodiments, software or a program, implementing UFNC processing in accordance with embodiments described herein, is provided as a service in a cloud environment.

In certain embodiments, the computing device 100 has the architecture of computing node 310. In certain embodiments, the computing device 100 is part of a cloud environment. In certain alternative embodiments, the computing device 100 is not part of a cloud environment.

ADDITIONAL EMBODIMENT DETAILS

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the flow diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer program product for comparing names, the computer program product comprising:
   a computer readable storage medium having computer readable program code embodied therewith, wherein the non-transitory computer readable program code, when executed by at least one processor of a computer, is configured to perform:
   receiving, into the computer, a first name for comparison;
   for each pair of names including the first name and a second name selected from a set of names:
     identifying features of the first name that comprise semantic relationships that include information about cultural derivation, hierarchical relationships that describe dependency relationships between multiple words that form a first name phrase within the first name, position information for each of the words in the first name phrase, and position information for name phrases in the first name;
     identifying features of the second name that comprise semantic relationships that include information about cultural derivation, hierarchical relationships that describe dependency relationships between multiple words that form a second name phrase within the second name, position information for each of the words in the second name phrase, and position information for name phrases in the second name;
     obtaining a first phrase score by comparing the first name phrase in the first name to the second name phrase in the second name;
     obtaining a second phrase score by comparing another name phrase in the first name to another name phrase in the second name;
     generating an overall score for the pair of names based on the obtained first phrase score and the obtained second phrase score; and
     updating the overall score for the pair of names based on comparing the features of the first name with the features of the second name; and
   providing, with the computer, a list of the second names from the set of second names that matched the first name in order of the updated score for each pair of names.

2. The computer program product of claim 1, wherein the computer readable program code, when executed by the at least one processor of the computer, is configured to perform:
   obtaining additional phrase scores; and
   selecting highest phrase scores from among the first phrase score, the second phrase score, and the additional phrase scores for generating the overall score.

3. The computer program product of claim 1, wherein the computer readable program code, when executed by the at least one processor of the computer, is configured to perform:
   adjusting the first phrase score for at least one of an incompatible feature and a missing dependency feature.

4. The computer program product of claim 1, wherein the computer readable program code, when executed by the at least one processor of the computer, is configured to perform:
   adjusting the first phrase score based on comparing the features of the first name with the features of the second name.

5. The computer program product of claim 1, wherein a Software as a Service (SaaS) is configured to perform the computer program product operations.

6. A computer system for comparing names, comprising:
   at least one processor; and
   a storage device connected to the at least one processor, wherein the storage device has stored thereon a program, and wherein the at least one processor is configured to execute instructions of the program to perform operations, wherein the operations comprise:
   receiving, into the computer system, a first name for comparison;
   for each pair of names including the first name and a second name selected from a set of names:
     identifying features of the first name that comprise semantic relationships that include information about cultural derivation, hierarchical relationships that describe dependency relationships between multiple words that form a first name phrase within the first name, position information for each of the words in the first name phrase, and position information for name phrases in the first name;

identifying features of the second name that comprise semantic relationships that include information about cultural derivation, hierarchical relationships that describe dependency relationships between multiple words that form a second name phrase within the second name, position information for each of the words in the second name phrase, and position information for name phrases in the second name;

obtaining a first phrase score by comparing the first name phrase in the first name to the second name phrase in the second name;

obtaining a second phrase score by comparing another name phrase in the first name to another name phrase in the second name;

generating an overall score for the pair of names based on the obtained first phrase score and the obtained second phrase score; and updating the overall score for the pair of names based on comparing the features of the first name with the features of the second name; and providing, with the computer system, a list of the second names from the set of second names that matched the first name in order of the updated score for each pair of names.

7. The computer system of claim 6, further comprising:

obtaining additional phrase scores; and selecting highest phrase scores from among the first phrase score, the second phrase score, and the additional phrase scores for generating the overall score.

8. The computer system of claim 6, further comprising:

adjusting the first phrase score for at least one of an incompatible feature and a missing dependency feature.

9. The computer system of claim 6, further comprising:

adjusting the first phrase score based on comparing the features of the first name with the features of the second name.

10. The computer system of claim 6, wherein a Software as a Service (SaaS) is provided to perform the system operations.

* * * * *